United States Patent [19]

Peterson et al.

[11] Patent Number: 5,042,133

[45] Date of Patent: Aug. 27, 1991

[54] TESTING METHOD FOR ELECTRIC SHIFT CONTROL APPARATUS

[75] Inventors: David C. Peterson, Walled Lake; Keith V. Leigh-Monstevens, Troy, both of Mich.

[73] Assignee: Automotive Products (USA) Inc., Auburn Hills, Mich.

[21] Appl. No.: 483,070

[22] Filed: Feb. 21, 1990

Related U.S. Application Data

[63] Continuation-in-part of Ser. No. 323,825, Mar. 15, 1989.

[51] Int. Cl.$^5$ .......................................... B23Q 17/00
[52] U.S. Cl. ...................................... 29/407; 29/705; 29/469; 324/158 F
[58] Field of Search .......................... 29/407, 705, 469; 74/866, 335, 337.5, 473 R, 483 PB, 336 R; 73/866.1, 865.9; 324/158 F; 364/424.1

[56] References Cited

U.S. PATENT DOCUMENTS

| | | | |
|---|---|---|---|
| 2,281,734 | 5/1942 | Whittaker | 171/97 |
| 2,634,622 | 4/1953 | Cripe | 74/335 |

(List continued on next page.)

FOREIGN PATENT DOCUMENTS

| | | |
|---|---|---|
| 0081656 | 6/1983 | European Pat. Off. |
| 0134646 | 3/1985 | European Pat. Off. |
| 0310275 | 4/1989 | European Pat. Off. |
| 0310387 | 4/1989 | European Pat. Off. |
| 0316300 | 5/1989 | European Pat. Off. |
| 0316301 | 5/1989 | European Pat. Off. |
| 0316302 | 5/1989 | European Pat. Off. |
| 0316303 | 5/1989 | European Pat. Off. |
| 0328299 | 8/1989 | European Pat. Off. |
| 0328362 | 8/1989 | European Pat. Off. |
| 3827660 | 3/1989 | Fed. Rep. of Germany |
| 56-49685 | 5/1981 | Japan |
| 58-13764 | 8/1983 | Japan |
| 60-40850 | 3/1985 | Japan |
| 8903319 | 4/1989 | PCT Int'l Appl. |
| 635278 | 3/1983 | Switzerland |
| 1295060 | 11/1972 | United Kingdom |
| 1455606 | 11/1986 | United Kingdom |

OTHER PUBLICATIONS

SAE Paper 810949, 1981.
SAE Paper 831776, 1983.
SAE Paper 840448, 1985.
SAE Paper 850289, 1985.
SAE Paper 850782, 1985.

(List continued on next page.)

Primary Examiner—Joseph M. Gorski
Assistant Examiner—S. Thomas Hughes
Attorney, Agent, or Firm—Krass & Young

[57] ABSTRACT

A method of providing a pretested electric shift control apparatus for a motor vehicle including an operator input push-button unit for mounting in the instrument panel of the motor vehicle, a power unit for mounting on the transmission of the motor vehicle, and a logic unit for mounting on the motor vehicle in a position in which it is electrically interconnected between the push-button unit and the power unit and operates to transmit operator input signals from the push-button unit to the power unit to shift the transmission to the position corresponding to the operator input. The method comprises the steps of manufacturing a plurality of push-button units; manufacturing a plurality of power units; manufacturing a plurality of logic units; providing a test assembly by assembling a push-button unit, a power unit, and a logic unit in a text fixture in a manner to simulate their assembled interrelationship on the motor vehicle; performing tests on the test assembly simulating the combined operation of the units on the motor vehicle; disassembling the test assembly into at least first and second tested modules; transporting the tested and disassembled modules to one or more motor vehicle manufacturing sites; and reassembling each tested first module on a motor vehicle in combination with a tested second module to provide a pretested electric shift control apparatus for the motor vehicle. A methodology is also disclosed for testing a shift control apparatus for shifting both the transmission and the transfer case of a four wheel drive motor vehicle.

17 Claims, 6 Drawing Sheets

U.S. PATENT DOCUMENTS

| | | | |
|---|---|---|---|
| 3,277,734 | 10/1966 | Bernard | 74/335 |
| 3,573,582 | 4/1971 | Petrocelli | 318/305 |
| 3,937,105 | 2/1976 | Arai et al. | 74/846 |
| 3,942,614 | 3/1976 | Thompson | 192/4 A |
| 4,065,983 | 1/1978 | Mimura | 74/625 |
| 4,246,990 | 1/1981 | Strantz | 192/4 C |
| 4,262,783 | 4/1981 | Scarrott et al. | 192/0.04 |
| 4,271,728 | 6/1981 | Wakamatsu | 74/866 |
| 4,275,618 | 6/1981 | Bale | 74/878 |
| 4,284,857 | 8/1981 | Slavin et al. | 381/199 X |
| 4,291,586 | 9/1981 | Buetemeister | 74/335 |
| 4,312,248 | 1/1982 | Sugimoto et al. | 174/861 |
| 4,324,153 | 4/1982 | Sugimoto et al. | 74/866 |
| 4,324,322 | 4/1982 | Sibeud | 192/0.032 |
| 4,339,962 | 7/1982 | Babel | 74/335 |
| 4,399,888 | 8/1983 | Contato | 180/315 |
| 4,428,248 | 1/1984 | Broucksau et al. | 74/335 |
| 4,493,228 | 1/1985 | Vukovich et al. | 74/858 |
| 4,495,457 | 1/1985 | Stahl | 364/424.1 |
| 4,541,609 | 9/1985 | Smith | 251/129.03 |
| 4,558,612 | 12/1985 | Shimizu et al. | 74/844 |
| 4,570,765 | 2/1986 | Makita | 192/139 |
| 4,583,171 | 4/1986 | Hara et al. | 364/424 |
| 4,602,528 | 7/1986 | Bailey | 74/861 |
| 4,621,328 | 11/1986 | Arai et al. | 364/424.1 |
| 4,638,690 | 1/1987 | Hattori et al. | 74/866 |
| 4,639,646 | 1/1987 | Harris et al. | 318/139 |
| 4,664,217 | 5/1987 | Welch | 180/247 |
| 4,790,204 | 12/1988 | Tury et al. | 74/483 PB |
| 4,821,607 | 4/1989 | Kawai | 74/866 |
| 4,823,643 | 4/1989 | Koshizawa | 74/866 |
| 4,825,831 | 5/1989 | Kawai | 123/360 |
| 4,825,993 | 5/1989 | Kurihara et al. | 192/0.092 |
| 4,841,815 | 6/1989 | Takahashi | 74/866 |
| 4,848,529 | 7/1989 | Kurihara et al. | 192/0.076 |
| 4,849,899 | 7/1989 | Cote et al. | 364/424.01 |
| 4,892,014 | 1/1990 | Morell et al. | 74/866 |

OTHER PUBLICATIONS

SAE Paper 860652, 1986.
SAE Paper 845094, 1984.
SAE Paper 861170, 1986.
SAE Paper 820392, 1982.
SAE Paper 820909, 1982.
SAE Paper 820920, 1982.
SAE Paper 830880, 1983.
SAE Paper 841307, 1984.
SAE Paper C247/85, 1985.
SAE Paper 852292, 1985.
SAE Paper 845094, 1984.
SAE Paper 861050, 1986.
Article entitled "Allison Transmissions Electronic Control for On-Highway Applications".

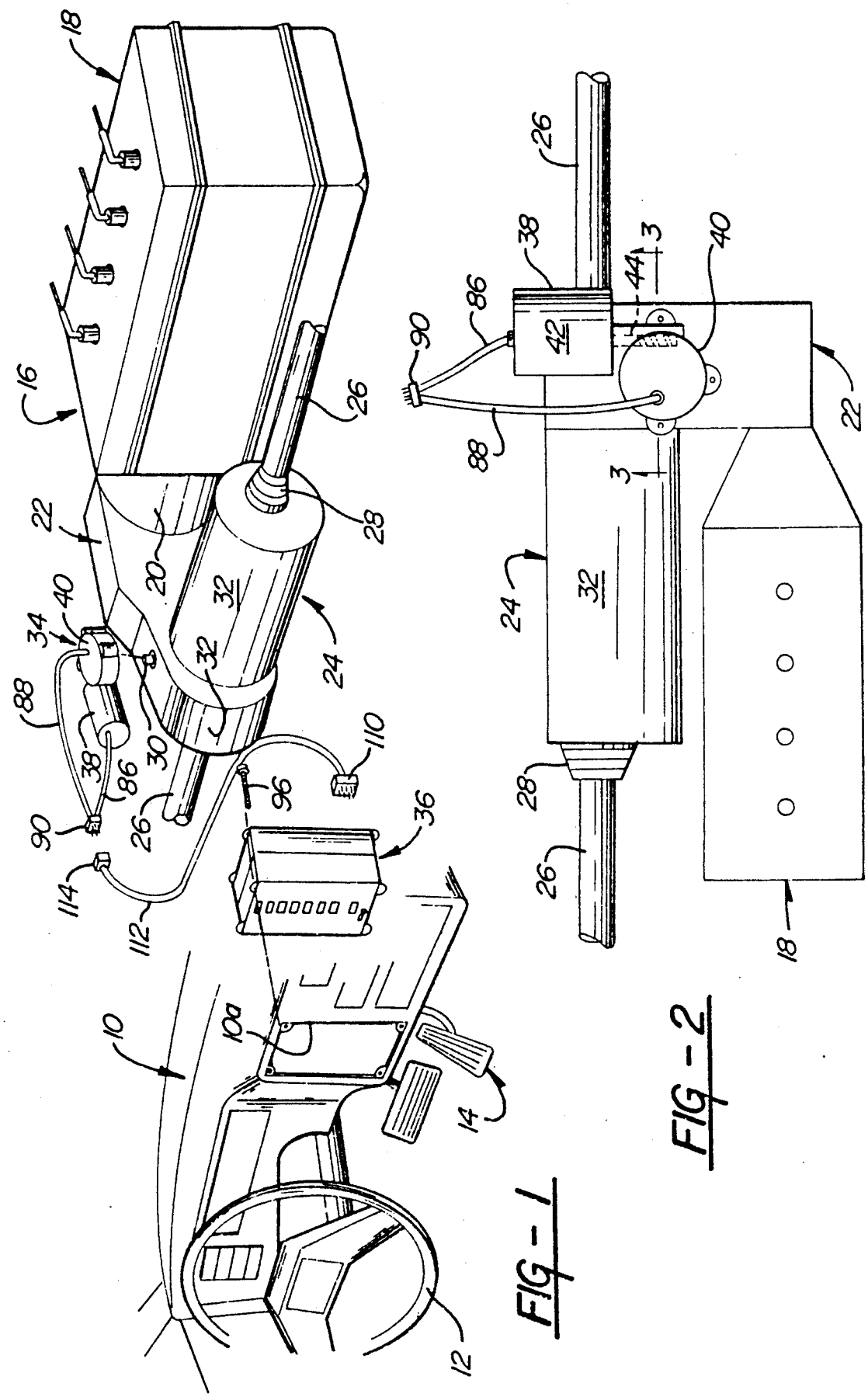

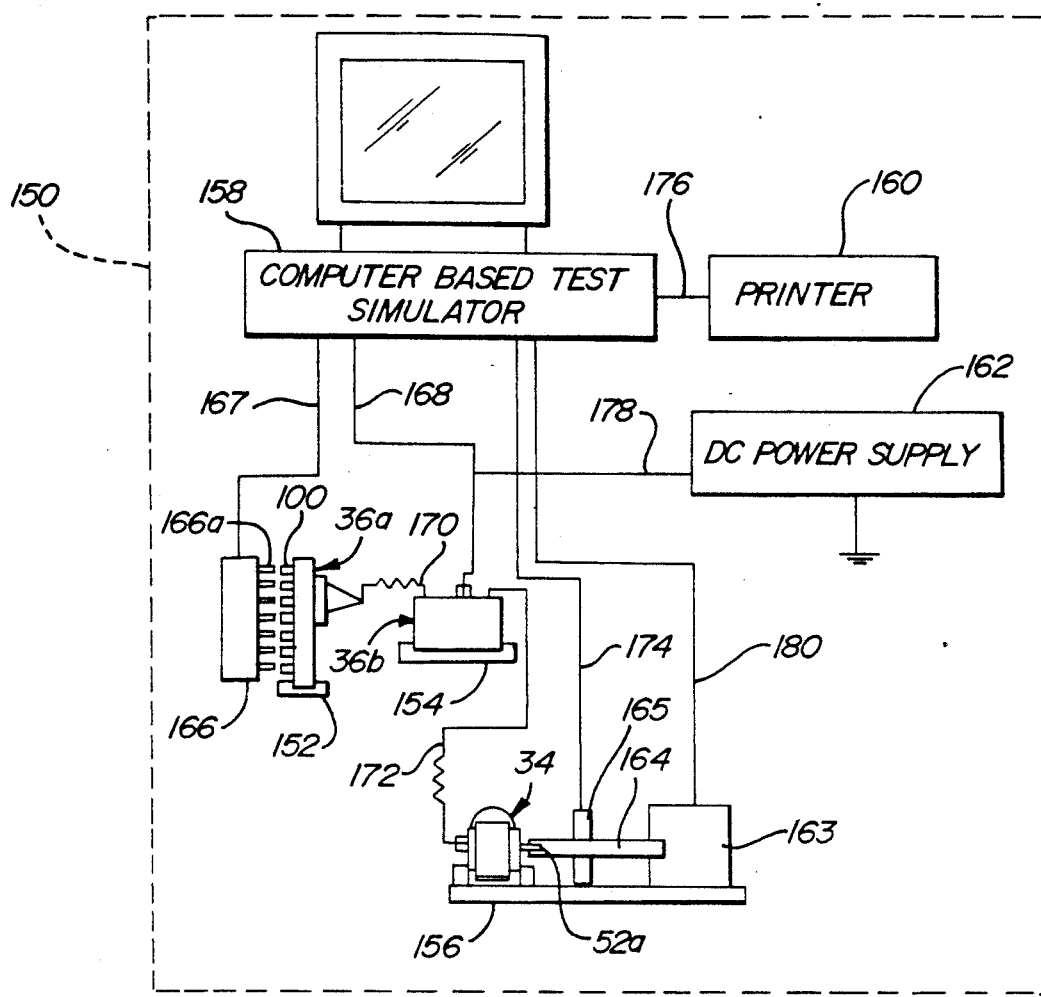
FIG-8
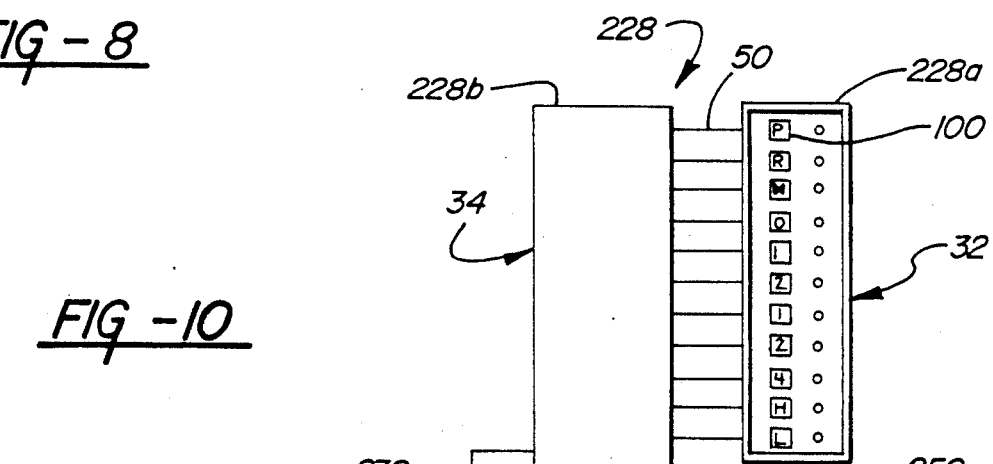
FIG-10
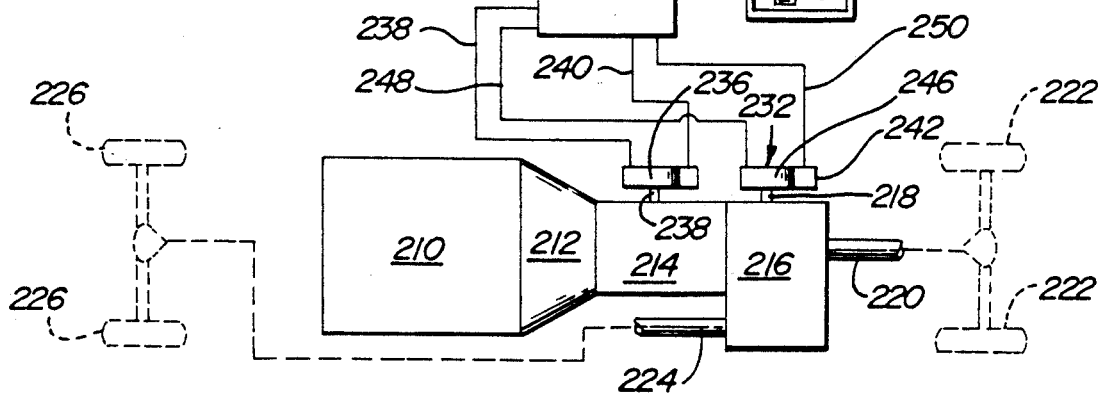

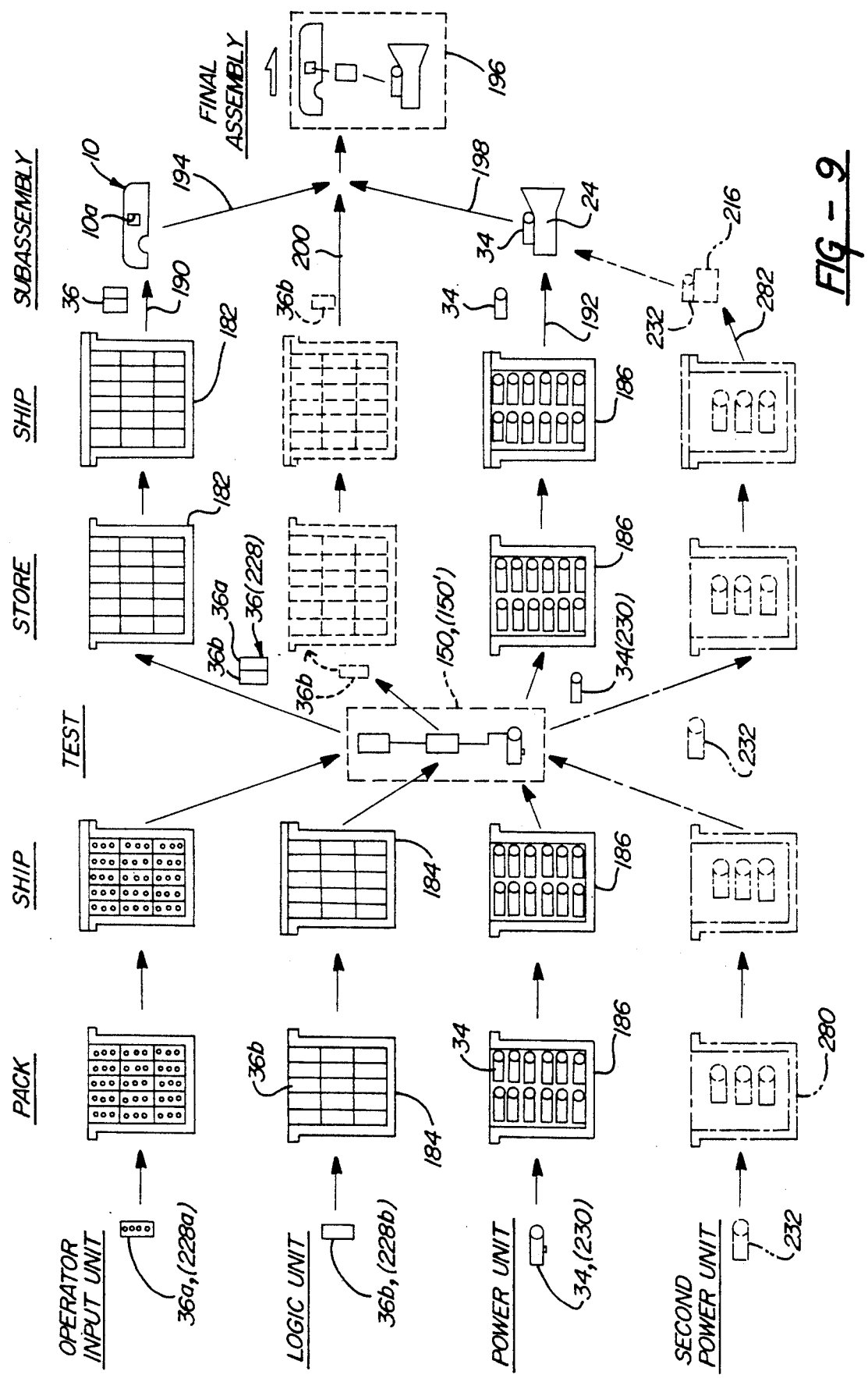

TESTING METHOD FOR ELECTRIC SHIFT CONTROL APPARATUS

RELATED APPLICATION

This application is continuation-in-part of U.S. patent application Ser. No. 323,825 filed on Mar. 15, 1989.

BACKGROUND OF THE INVENTION

This invention relates to electrical control apparatuses and more particularly to a method of testing an electric shift control apparatus for a motor vehicle.

Modern day motor vehicles typically include an automatic transmission in which the shifting is done in response to sensed speed and throttle opening parameters. Originally the automatic transmission was shifted between its various shift modes by a shift lever controlled by the operator and connected to a mode select member of the transmission by a cable or other mechanical linkage. More recently it has been proposed to provide an electric shift control apparatus for the automatic transmission wherein operator input to a push-button control unit positioned in the instrument panel of the vehicle is transmitted electrically to a logic unit which in turn transmits a command signal to a power unit positioned on the transmission housing to move the mode select member of the transmission to a position corresponding to the operator input. Electric shift control apparatus of this type are shown for example in U.S. Pat. Nos. 4,790,204, 4,817,471, 4,841,793 and 4,843,901, all assigned to the assignee of the present application. It has also been proposed to provide an electric shift control apparatus for a four wheel drive motor vehicle wherein the shift control apparatus further includes a further power unit positioned on the transfer case of the vehicle and operative in response to signals received from the logic unit to move the transfer case between its various positions. An electric shift control apparatus of this type is disclosed for example in U.S. application Ser. No. 412,007 filed Sept. 25, 1989 and assigned to the assignee of the present application.

Whereas these electric shift control apparatuses offer many advantages as compared to the prior art mechanical linkages, it is imperative for the commercial success of such apparatuses that each unit or component of the electric shift apparatus function reliably and consistently on the motor vehicle and that the total system perform the requested shifting operations in a trouble-free manner over a long vehicle life.

SUMMARY OF THE INVENTION

This invention is directed to the provision of a reliable electric shift control apparatus for a motor vehicle.

More specifically, this invention is directed to a method of providing a pretested and precalibrated electric shift control apparatus for the automatic transmission of a motor vehicle.

The invention method relates to the provision of a pretested electric shift control apparatus for the automatic transmission of a motor vehicle including a control unit for mounting on the instrument panel of the motor vehicle, a power unit for mounting proximate the transmission of the motor vehicle, and a logic unit for mounting on the motor vehicle in a position in which it is electrically interconnected between the control unit and the power unit and operates to transmit operator input signals from the control unit to the power unit to shift the transmission to the position corresponding to the operator input.

The invention method comprises the steps of manufacturing a plurality of control units; manufacturing a plurality of power units; manufacturing a plurality of logic units; providing a test assembly by assembling a control unit, a power unit and a logic unit in a test fixture in a manner to simulate their assembled interrelationship on the motor vehicle; performing tests on the test assembly simulating the combined operation of the units on the motor vehicle; disassembling the test assembly into at least first and second tested modules; transporting the tested and disassembled modules to one or more motor vehicle assembly sites; and reassembling each tested first module on a motor vehicle in combination with a tested second module to provide a pretested electric shift apparatus for the motor vehicle. This methodology allows the motor vehicle manufacturer to simply assemble the various units of the shift control apparatus into the motor vehicle without need for testing or calibrating, either on an individual component basis or on a total assembled apparatus basis.

In one embodiment of the invention method, the disassembly step comprises disassembling the test assembly into a first module comprising a power unit and a second module comprising a control unit connected to a logic unit, and the transporting step comprises transporting the first control module to a motor vehicle chassis assembly site for attachment to the automatic transmission of the motor vehicle and transporting the second control module to a motor vehicle body assembly site for mounting in the instrument panel of the motor vehicle.

In another embodiment of the invention method, the disassembly step comprises disassembling the test assembly into a first module comprising a power unit, a second module comprising a control unit, and a third module comprising a logic unit, and the transporting step comprises transporting the power module to a motor vehicle chassis assembly site for attachment to the automatic transmission of the motor vehicle, transporting the control module to a motor vehicle body assembly site for mounting in the instrument panel of the motor vehicle, and transporting the logic control module to a motor vehicle assembly site for mounting on the motor vehicle in a position to facilitate its electrical interconnection between the power module and the control module.

According to a further feature of the invention, the automatic transmission includes the transmission states of park, reverse, neutral and drive; the logic unit is programmed to cycle the transmission to park upon turning off of the vehicle ignition; and the tests include a test wherein, with the power unit in a position corresponding to a transmission position other than park, a vehicle ignition off signal is simulated and the shifting of the power unit to a position corresponding to the transmission state of park is monitored.

According to a further feature of the invention, the automatic transmission includes the transmission states of park, reverse, neutral and drive; the logic unit is programmed to refuse to signal the power unit to move out of a position corresponding to the transmission state of park unless the logic unit receives a vehicle braking signal; and the tests include a test wherein, with the power unit in a position corresponding to the transmission state of park, and in the absence of a braking signal, an operator input other than park is supplied to the logic unit via the control unit and the shifting of the power module to a position corresponding to the operator input is monitored.

According to a further feature of the invention, the automatic transmission includes the transmission states of park, reverse, neutral and drive and the tests include a test wherein, with the power unit in a position corresponding to the transmission state of park and with the power unit output loaded to simulate disposition of the vehicle on a grade, an operator input other than park is supplied to the logic unit via the control unit and the shifting of the power unit to a position corresponding to the operator input is monitored.

According to a further feature of the invention, the automatic transmission includes the transmission states of park, reverse, neutral and drive and one of the tests includes a test to cycle the power unit to positions corresponding to all of the transmission states in response to corresponding operator inputs to the logic unit via the control unit.

According to a further feature of the invention, the automatic transmission includes the transmission states of park, reverse, neutral and drive; the logic unit is programmed to refuse to transmit respective shift signals to the power unit unless respective vehicle speed thresholds are satisfied; and one of the tests includes a test wherein respective operator inputs are transmitted to the logic unit via the control unit corresponding to the various transmission states while transmitting respective simulated vehicle threshold signals to the logic unit and the shifting of the power unit is observed.

The invention method further relates to the provision of a pretested electric shift control apparatus for a motor vehicle of the four wheel drive type including a transfer case drivingly connected to the output of the automatic transmission wherein the electric shift control apparatus further includes a second power unit for mounting proximate the transfer case to shift the transfer case between its several positions in response to operator input signals as relayed by the logic unit.

In the invention method as applied to a four wheel drive vehicle including a second power unit associated with the transfer case, the test assembly includes a second power unit arranged in the test fixture in a manner to simulate its assembled interrelationship on the motor vehicle to the logic unit, the operator input unit, and the first power unit; the test assembly is disassembled following the test procedure into at least first, second and third tested modules; and each tested first module is reassembled on a motor vehicle in combination with a tested second module and a tested third module. This methodology allows the motor vehicle manufacturer to simply assemble the various units of the shift control apparatus into the motor vehicle without need for testing or calibrating, either on an individual component basis or on a total assembled apparatus basis. The first module may comprise for example a first power unit, the second module may comprise for example an operator input unit connected to a logic unit, and the third module may comprise for example a second power unit. The first, second, and third tested modules are thereafter transported to various motor vehicle assembly sites for attachment to respective portions of the motor vehicle so as to provide a complete electric shift control apparatus for the automatic transmission and the transfer case at the final assembly of the motor vehicle.

BRIEF DESCRIPTION OF THE DRAWINGS

FIG. 1 is a fragmentary perspective view of a front wheel drive motor vehicle embodying the invention electric shift apparatus;

FIG. 2 is a fragmentary plan view of the front wheel drive assembly of the vehicle of FIG. 1;

FIG. 8 is a schematic view of a test fixture utilized in the invention methodology;

FIG. 9 is a flow diagram illustrating the invention metholog;

FIG. 10 is a fragmentary perspective view of a four wheel drive motor vehicle embodying a modified form of the invention electric shift apparatus.

DETAILED DESCRIPTION OF THE PREFERRED EMBODIMENT

Figure 3:
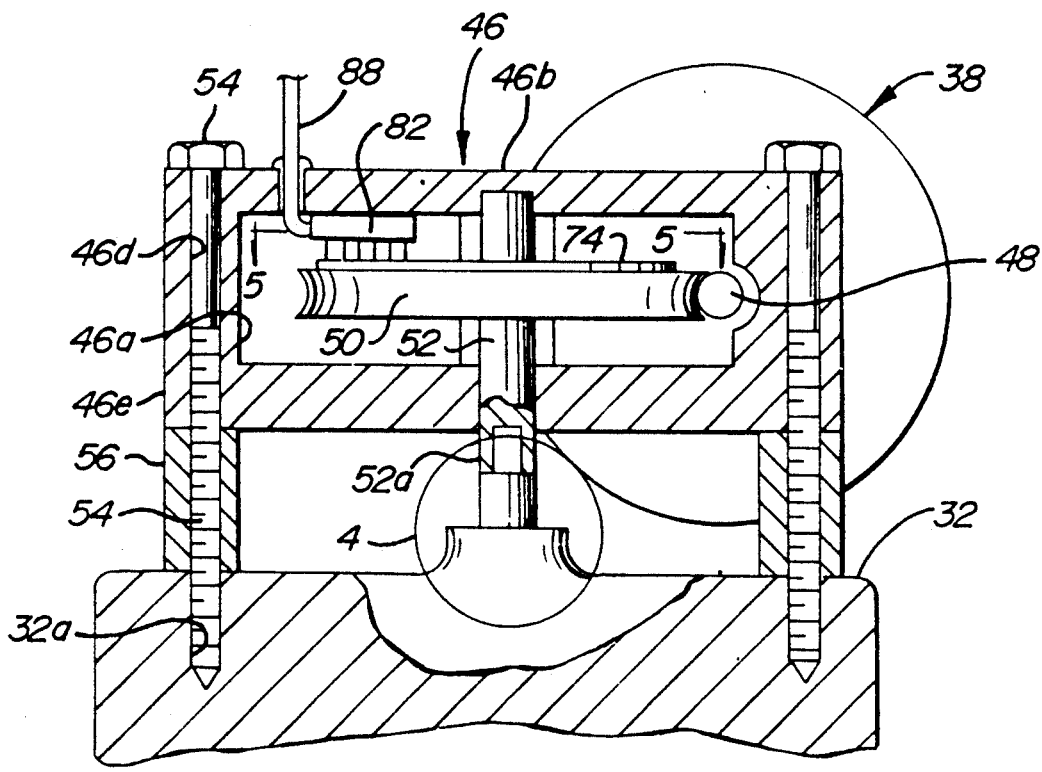
FIG. 3 is a view taken on line 3—3 of FIG. 2.
Figure 4:
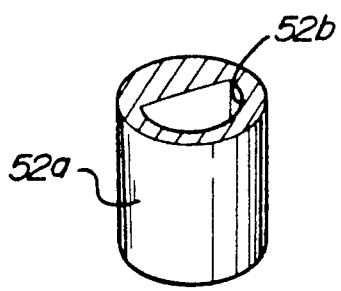
FIG. 4 is a fragmentary exploded perspective view of the structure within the circle 4 of FIG. 3.
Figure 5:
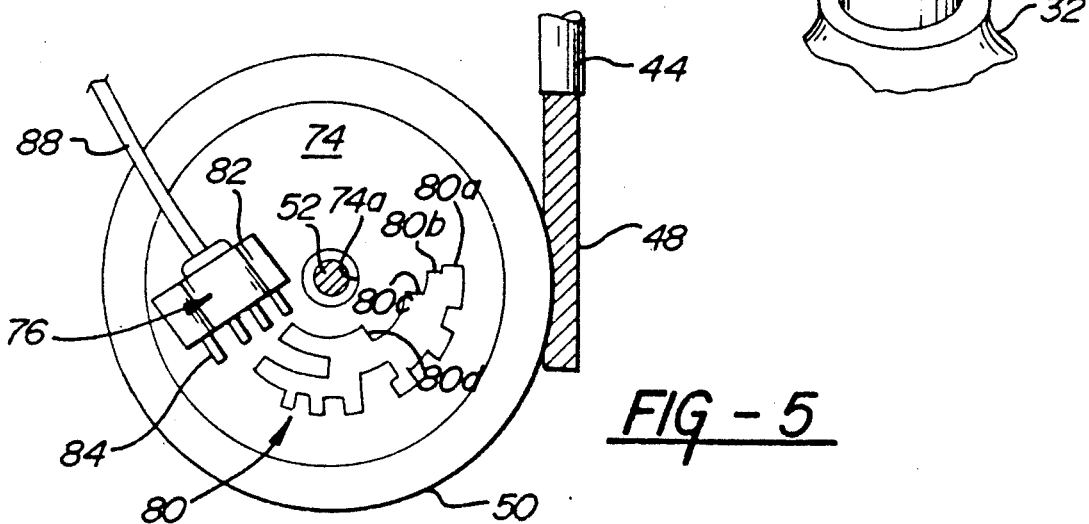
FIG. 5 is a view taken on line 5—5 of FIG. 3.
Figure 6:
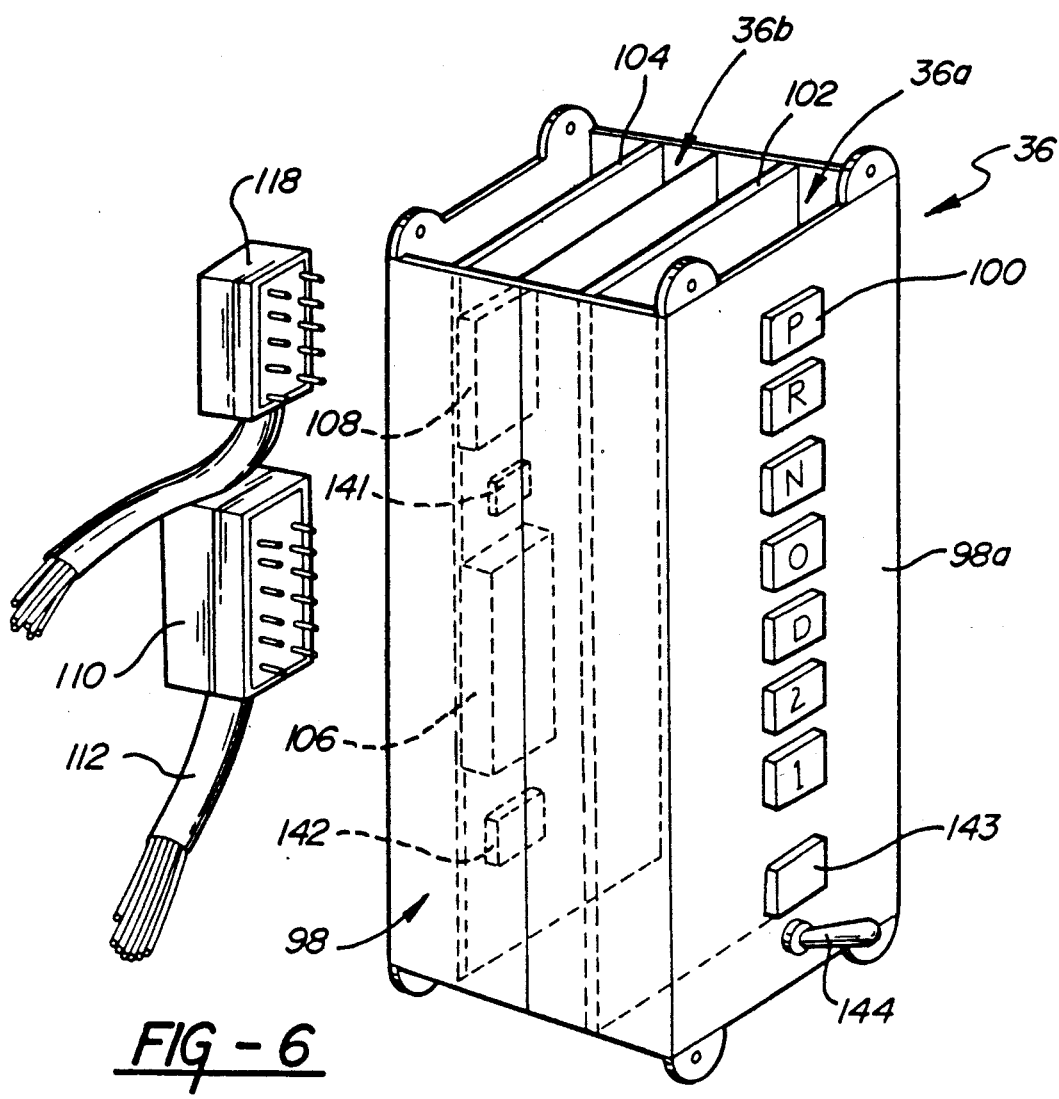
FIG. 6 is a fragmentary perspective view of a control module employed in the invention electric shift apparatus.

An electric shift apparatus is seen schematically in FIG. 1 in association with a motor vehicle of the front wheel drive type and including an instrument panel assembly 10 positioned within the passenger compartment of the motor vehicle; a steering wheel 12 associated with the instrument panel; an accelerator pedal assembly 14; and a front wheel drive assembly 16.

Front wheel drive assembly 16 includes an internal combustion engine 18 mounted transversely in the engine compartment of the vehicle, a torque converter 20 driven by engine 18, a gear drive assembly 22, an automatic transmission 24, and drive shafts 26 drivingly connected to the opposite ends of transmission 24 by U joints 28. Transmission 24 includes a mode select shaft 30 having a free upper end positioned above the housing 32 of the transmission 24 and operable in known manner in response to rotation of the shaft to operate internal devices within the transmission to position the transmission in a plurality of transmission modes such as park, neutral, drive, etc.

The electric shift apparatus, broadly considered, comprises a power module 34 and a control module 36.

Power module 34 is adapted to be bolted to transmission housing 32 in proximity to mode select shaft 30 and control module 36 is adapted to be positioned in the instrument panel assembly 10 of the vehicle for convenient operator access.

Power module 34 is in the form of a motor assembly and includes a DC electric motor 38 and a speed reduction unit 40.

Motor 38 is a direct current motor having, for example, an output torque rating of 200 inch pounds) and includes a housing 42 and an output shaft 44.

Speed reduction unit 40 includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm gear 48, and an output shaft 52 driven by worm wheel 50, journalled in housing walls 46b and 46c, and including a free lower end 52a positioned outside of and below housing wall 46c. Shaft lower end 52a includes a D shaped opening 52b for driving, coupling receipt of the D shaped upper end portion 30a of mode select shaft 30. Motor assembly 34 is mounted on the upper face of transmission housing 32 by a plurality of bolts 54 passing downwardly through bores 46d in lug portions 46e of reduction unit housing 46 and downwardly through spacers 56 for threaded receipt in tapped bores 32a in transmission housing 32. In assembled relation, reduction unit output shaft 52 is coaxially aligned with mode select shaft 30, and D opening 52b in reduction shaft lower end 52a telescopically receives D shaped upper end 30a of mode select lever 30 so that actuation of motor 38 acts through worm shaft 48, worm wheel 50, and reduction unit output shaft 52 to drive mode select shaft 30.

Power module 34 further includes an encoder assembly 72 operative to sense the instantaneous shift position of the transmission and generate an encoded signal representative of the sensed shift position.

Encoder assembly 72 includes an encoder wheel 74 and a pickup device 76. Encoder wheel 74 may be formed for example of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pickup device 76 are combined into a pin-type plug 90.

Control module 36 is intended for ready installation in an opening 10a in instrument panel 10 by insertion of the module from the rear of the panel and fastening of the module within opening 10a by the use of several fasteners such as seen at 96. Module 36 includes a housing structure 98 of general box-like configuration enclosing an operator input or push button unit or submodule 36a and a logic unit or submodule 36b.

Operator input submodule 30a includes a plurality of push buttons 100 positioned in vertically spaced relation in the front face 98a of the module housing and corresponding to the available transmission shift modes. Specifically, buttons 100 include buttons corresponding to park, reverse, neutral, over-drive, drive, second and first shift positions for the transmission. Buttons 100 coact in known manner with a printed circuit board 102 to generate suitable electrical signals in response to respective depression of the buttons 100.

Logic submodule 36b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes a plug 114 at its remote end for plugging receipt of plug 90 so that plug 110 embodies the information from leads 86 and 88. Connector terminals 108 coact with a pin-type plug 118. Plug 118 embodies the information from leads 120, 121, 122, 123, 124, and 125.

Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed which the vehicle is traveling.

The invention electric shift assembly is normally delivered to the vehicle manufacturer in the form of power module 34 and control module 36. During the assembly of the vehicle, the power module 34 is mounted on the transmission housing 32 in coupling relation to mode select shaft 30 and the control module 36 is mounted in the instrument panel 10, whereafter plug 90 is plugged into plug 114 and plugs 110 and 118 are plugged into control module 36 to complete the assembly of the invention electric shift apparatus.

The mounting of power module 34 on the transmission housing is accomplished simply by positioning the lower end 52a of reduction shaft 52 over the upper end 30a of mode select shaft 30 and passing bolts 54 downwardly through bores 46d and spacers 56 for threaded engagement with tapped bores 32a in transmission housing 32.

Installation of control module 36 in instrument panel 10 is affected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational and ready for use.

Figure 7:
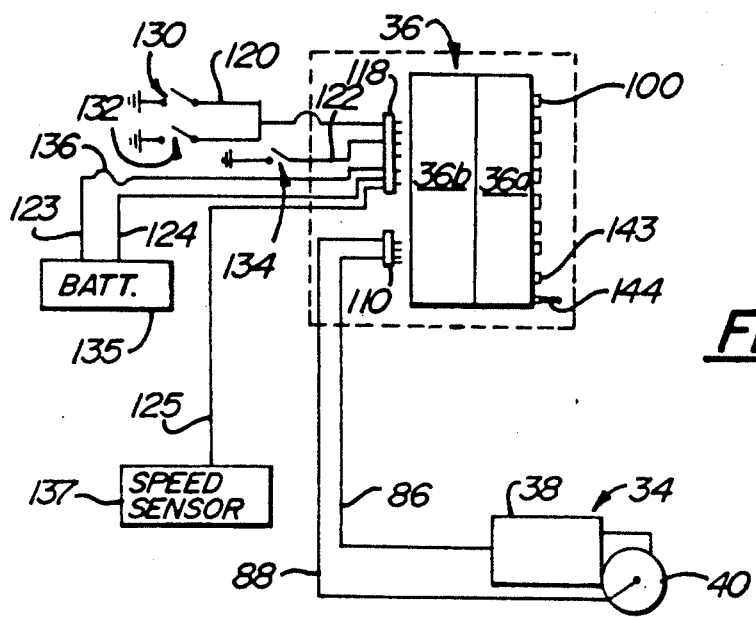
FIG. 7 is a circuit diagram for the invention electric shift apparatus.

In use, various input signals, such as described above and illustrated in FIG. 7, are supplied to a logic chip 141, which may be a programmable logic array or a gate array. Logic chip 141 is configured to receive these input signals and generate the necessary drive signals to motor 38 via a buffer 142 for providing the selection of the desired gear. Firstly, the various input signals are formed into a set of logic signals.

Logic chip 141 serves to compare the inputs indicating the depressed push button with the inputs indicating the present gear. If they differ, then logic chip 141 generates an output signal to motor 38 to rotate the motor until the present gear matches the selected gear. This process includes an indication of which shifts are up-shifts and which are downshifts according to Boolean equations.

As soon as the instantaneous encoder signal transmitted by pickup device 76 matches the signal generated by the specific depressed push button, the comparator logic of control module 36 functions to de-energize and brake the motor so that the mode select shaft 30, and thereby the transmission, is stopped precisely in the selected shift position.

Logic chip 141 is programmed so as not to permit a shift into first when the vehicle speed is in excess of 20 miles per hour; to not permit a shift into second if the vehicle speed is in excess of 30 miles per hour; to not permit a shift into reverse if the vehicle speed is in excess of 7 miles per hour; to not permit a shift into park if the vehicle speed is in excess of 3 miles per hour; to automatically cycle the transmission to park when the ignition is switched off and the vehicle speed is not greater than 3 miles per hour; and to refuse to allow shifting of the transmission out of the park position in the absence of a vehicle braking signal.

The manner in which the various input signals are formed into a set of logic signals; the specific Boolean equations employed; the manner in which the control system functions to receive an input or request signal, compare it to the present transmission state signal and suitably energize the motor to shift the transmission to the desired state; the manner in which the logic unit is programmed to shift the transmission to park upon ignition turnoff; the manner in which the logic unit is programmed to refuse to shift out of park in the absence of a braking signal; and the manner in which the logic unit formulates and utilizes the various threshold speed signal are explained in further detail in U.S. Pat. Nos. 4,790,204, 4,817,471 and 4,841,793, as well as in U.S. patent application Ser. No. 311,982 filed Feb. 16, 1989, all assigned to the assignee of the present application.

A test fixture 150 employed in the invention test methodology is seen in diagrammatic form in FIG. 8. Test fixture 150 includes an operator input unit fixture 152, a logic unit fixture 154, a power unit fixture 156, a computer based test simulator 158, a printer 160, a DC power supply 162, an electromagnetic brake 163 drivingly connected to a shaft 164, a separate gear position encoder 165 encircling shaft 164, and a push-button actuator 166. Encoder 165 may, for example, comprise a unit available from Robbins & Myers/Renco of Goleta, Calif., as Part No. R5000. Push-button actuator 166 may take various forms and may, for example, comprise a series of air cylinders respectively controlling push-button actuators 166a and operating off a manifold valve body including solenoid controlled valves operated by appropriate signals from simulator 158.

To perform the invention test procedure, an operator input unit 36a is positioned in control unit fixture 152 with push buttons 100 in respective confronting relation to push-button actuators 166a of actuator 166; a logic unit 36b is positioned in logic unit fixture 154; a power unit 34 is positioned in power unit fixture 156 with power unit output shaft 52a drivingly coupled to shaft 164, output shaft 52a disposed in an annular position corresponding to the overdrive position of the transmission, and encoder pickup device 76 adjusted to an angular position corresponding to the overdrive position of the transmission; push-button actuator 166 is connected to simulator 158 via lead 167; logic unit 36b is connected to simulator 158 via lead 168; control unit 36a is connected to logic unit 36b via lead 170; logic unit 36b is connected to power unit 34 via lead 172; separate gear position encoder 165 is connected to simulator 158 via lead 174; printer 160 is connected to simulator 158 via lead 178; DC power supply 162 is connected to lead 168 via lead 178; and electromagnetic brake 163 is connected to simulator 158 via lead 180.

Simulator 158 is programmed to perform tests on the test assembly that simulate the combined operation of the various units on the motor vehicle. Specifically:

(1) With the power unit in a position corresponding to overdrive, simulator 158 transmits a nominal load signal to electromagnetic brake 163 and a simulated ignition OFF signal and a simulated threshold speed signal below 3 miles per hour to the logic unit. The power unit should cycle to a position corresponding to a transmission state of park. If the power unit does not cycle to park, further tests are performed on the logic unit and on the power unit and the defective unit is rejected.

(2) With the power unit in a position corresponding to park, simulator 158 continues to transmit a nominal load signal to electromagnetic brake 163; transmits a simulated ignition ON signal and a simulated "service brake not applied" signal to the logic unit; and transmits a signal to push-button actuator 166 to actuate the push button of the operator input unit corresponding to overdrive so as to transmit an overdrive signal to the logic unit for transmittal to the power unit. If the power unit shifts, the logic unit is rejected.

(3) With the power unit still in a position corresponding to park, simulator 158 transmits a simulated ignition ON signal and a simulated "service brake on" signal to the logic unit; transmits a fully energized signal to electromagnetic brake 163 to apply a load to the shaft 164 and thereby to the power unit corresponding to the effort required to pull the transmission out of park with the vehicle parked on a 30 percent grade; and transmits a signal to push-button actuator 166 to actuate the push button of the operator input unit corresponding to reverse so as to transmit a reverse signal to the logic unit for transmittal to the power unit. If the power unit does not shift to reverse within a specified time, further tests are performed on the logic unit and on the power unit and the defective unit is rejected.

(4) Simulator 158 now resets the electromagnetic brake 163 to apply a nominal shift load to the shaft 164 and the simulator provides sequential signals to the push-button actuator to actuate the buttons of the operator input unit in a manner to transmit sequential shift signals to the logic unit and thereby to the power unit in the following order: reverse, neutral, overdrive, drive, second, first, second, drive, overdrive, neutral, reverse, park, overdrive. The test apparatus measures and records the shift time between shifts, the current draw of the motor of the power unit, the logic unit charge pump voltage, the electrical noise and contact bounce on the push buttons of the operator input unit, and the positioning accuracy of the power unit output shaft. If any of the units do not meet specifications, they are rejected.

(5) With the power unit in a position corresponding to overdrive, simulator 158 verifies the speed lockouts by actuating the operator input unit to transmit a park signal to the logic unit while transmitting a simulated threshold speed signal of 3 miles per hour to the logic unit; by actuating the operator input unit to transmit a reverse signal to the logic unit while transmitting a simulated threshold speed signal of 7 miles per hour to the logic unit; by actuating the operator input unit to transmit a second speed signal to the logic unit while transmitting a simulated vehicle speed signal of 30 miles per hour to the logic unit; and by actuating the operator input unit to transmit a first speed signal to the logic unit while transmitting a simulated vehicle speed signal of 20 miles per hour to the logic unit. If the power unit shifts in response to any of the above shift signals, it is rejected.

The manner in which the test fixture 150 is incorporated into the overall invention methodology is illustrated in FIG. 9.

Specifically, a plurality of operator input units 36a are manufactured, gathered together and placed in a suitable container or dunnage 182, and shipped to the test site. Similarly, a plurality of logic units 36b are manufactured, placed in a suitable container or dunnage 184, and shipped to the test site. Similarly, a plurality of power units 34 are manufactured, placed in a container or dunnage 186, and shipped to the test site.

At the test site, an operator input unit 36a, a logic unit 36b, and a power unit 34 are placed in the respective fixtures of the test fixture 150 in the manner previously described with respect to FIG. 8 and the various previously described tests are performed on the units. Following the various tests, and assuming that all the units pass the various tests, the test assembly is disassembled into a control module 36, comprising an operator input unit 36a connected to a logic unit 36b, and a power unit module 34. The control modules 36 are placed back in the container or dunnage 182 and the tested modules are shipped to a motor vehicle body assembly site where each module 36 is mounted in an opening 10a of an instrument panel 10 moving along a trim line 190. The power modules 34 are placed back in the dunnage 186 and the tested modules are shipped to a motor vehicle chassis assembly site where each power module 34 is mounted on an automatic transmission 24 moving along an automatic transmission assembly line 192. Instrument panels 10, with a control module 36 installed therein, move along the trim line 190 and thence to the main body assembly line 194 and thence to the final vehicle assembly location 196. Similarly, transmissions 194 with power units 34 attached thereto move along the transmission line 192 and thence to the main chassis line 198 and thereafter to the main assembly point 196 where the body and chassis are combined to form the final vehicle. Connectors 110 and 118 are now plugged into the logic unit 36b and the shift control apparatus is operational. Since each of the components of the shift control apparatus has previously been tested in an environment that totally and accurately simulates the motor vehicle, environment, there is no need for the motor vehicle manufacturer to test the shift apparatus on an individual component basis or on a system basis, nor is there any need to calibrate the individual units or the total system since calibration has occurred during the testing procedures and has not been disturbed by the subsequent shipping and assembly operations.

In an alternate form of the invention methodology, as seen in dash lines in FIG. 9, the test assembly, after testing in the test fixture 150, may be disassembled into three separate modules including an operator input module 36a, a logic module 36b, and a power module 34. In this version of the invention methodology, the operator input module 36a, as before, is transported to a vehicle trim line 190 for installation in the opening 10a in the vehicle instrument panel; the power unit 34 is transported, as before, to the transmission assembly line 192 for attachment to a transmission 24; and the logic module 36b is transported to a further motor vehicle assembly line 200, which may comprise either a chassis or a body assembly line, where the logic module 36b is secured to the appropriate motor vehicle body structure or chassis structure and transported to the final assembly point 196 for electrical connection to the operator input module 36a installed in the vehicle instrument panel and the power unit 34 installed on the vehicle transmission. This alternate form of methodology is employed in situations where there is insufficient room behind the vehicle instrument panel to allow the mounting of both the operator input unit 36a and the logic unit 36b in the instrument panel opening 10a.

The electric shift control apparatus of FIG. 10 is intended to control a motor vehicle four wheel drive power train of the type including an engine 210, a torque converter 212, a transmission 214, and a transfer case 216. Converter 212 is of known form and comprises a viscous coupling interposed between the output of the engine and the input of the transmission 214. Transmission 214 is of the automatic transmission type and may take various forms but preferably includes a plurality of planetary gear sets which are selectively controlled to provide the various shift modes of the transmission.

Transfer case 216 operates in known manner to provide either two wheel or four wheel drive for the associated motor vehicle. The transfer case also preferably provides high and low ranges. The internal workings of the transfer case are not part of the present invention but the transfer case is preferably of the type in which a single mode selector shaft 218 may be rotated to provide high and low range operation as well as two and four wheel drive operation of the transfer case. An arrangement of this type is shown for example in U.S. Pat. No. 4,664,217. It will be understood that the transfer case 216 functions in its two wheel drive position to drive output shaft 220 to drive rear wheels 222 while maintaining front drive shaft 224 in a neutral condition and functions in its four wheel drive position to provide power to both rear drive shaft 220 and front drive shaft 224 so as to provide power simultaneously to rear wheels 222 and front wheels 226.

The shift control system of the FIG. 10 embodiment includes a control module 228, a first power module 230, and a second power module 232.

Control module 228 is intended for ready installation in an opening in the instrument panel of the vehicle and includes an operator input or push button unit or submodule 228a and a logic unit or submodule 228b.

Push button unit 228a corresponds generally to push button unit 36a of the FIGS. 1-9 embodiment with the exception that additional push buttons 100 are provided corresponding to two wheel, four wheel, high range and low range shift positions for the transfer case.

Logic submodule 228b is preferably secured to push button submodule 228a to form the control module 228 and corresponds generally to the logic module 36b of the FIGS. 1-10 embodiment with appropriate logic refinement to accommodate the peculiarities of the drive train of the FIG. 10 embodiment.

Power module 230 corresponds generally to the power module 34 of the FIGS. 1-9 embodiment and includes an electric DC motor 234 rigidly secured to the housing of a speed reduction unit 236 having an output shaft 238 drivingly coupled to the mode select shaft 30 of the automatic transmission. Mode select shaft 30, in known manner, is operative in response to rotation thereof to move a shuttle valve within the transmission between valve positions respectively corresponding to the park, reverse, neutral, overdrive, drive, second gear and first gear modes of the transmission.

Power unit 230 further includes an encoder assembly, identical to the encoder assembly 72 described in association with the power unit 34 of the FIGS. 1-10 embodiment, connected to input of logic submodule 228b by a lead 238 and a lead 240 connects the output of logic module 228b to motor 234. It will be understood that power unit 230 operates in response to appropriate signals from logic submodule 228b in response to operator inputs provided to push button module 228a to shift the transmission, in the manner previously described with respect to the FIGS. 1-9 embodiment, between its various shift modes in accordance with the selected push buttons P, R, N, O, D, 2 or 1.

Power unit 232 is identical to power unit 230 and includes an electric DC motor 242 driving a gear reduction unit 246 with the output shaft of the reduction unit 246 drivingly coupled to the upper end of transfer case mode selector shaft 218. Power unit 246 further includes an encoder assembly, identical to the encoder assembly 72 of the FIGS. 1-9 embodiment, connected to the input of logic submodule 228 by a lead 248. A further lead 250 connects the output of logic submodule 228b to motor 242.

It will be understood that power unit 232 functions in response to signals from logic submodule 228 as inputted by the push buttons 2,4,H, and L corresponding to the various modes of the transfer case to shift the transfer case between its various modes. Specifically, depression of push button H results in the shifting of the transfer case to its high range; depression of the push button L results in the shifting of the transmission to its low range; depression of the push button 2 results in the shifting of the transfer case to a two wheel drive mode; and depression of the push button 4 results in the shifting of the transfer case to a four wheel drive mode.

Figure 11:
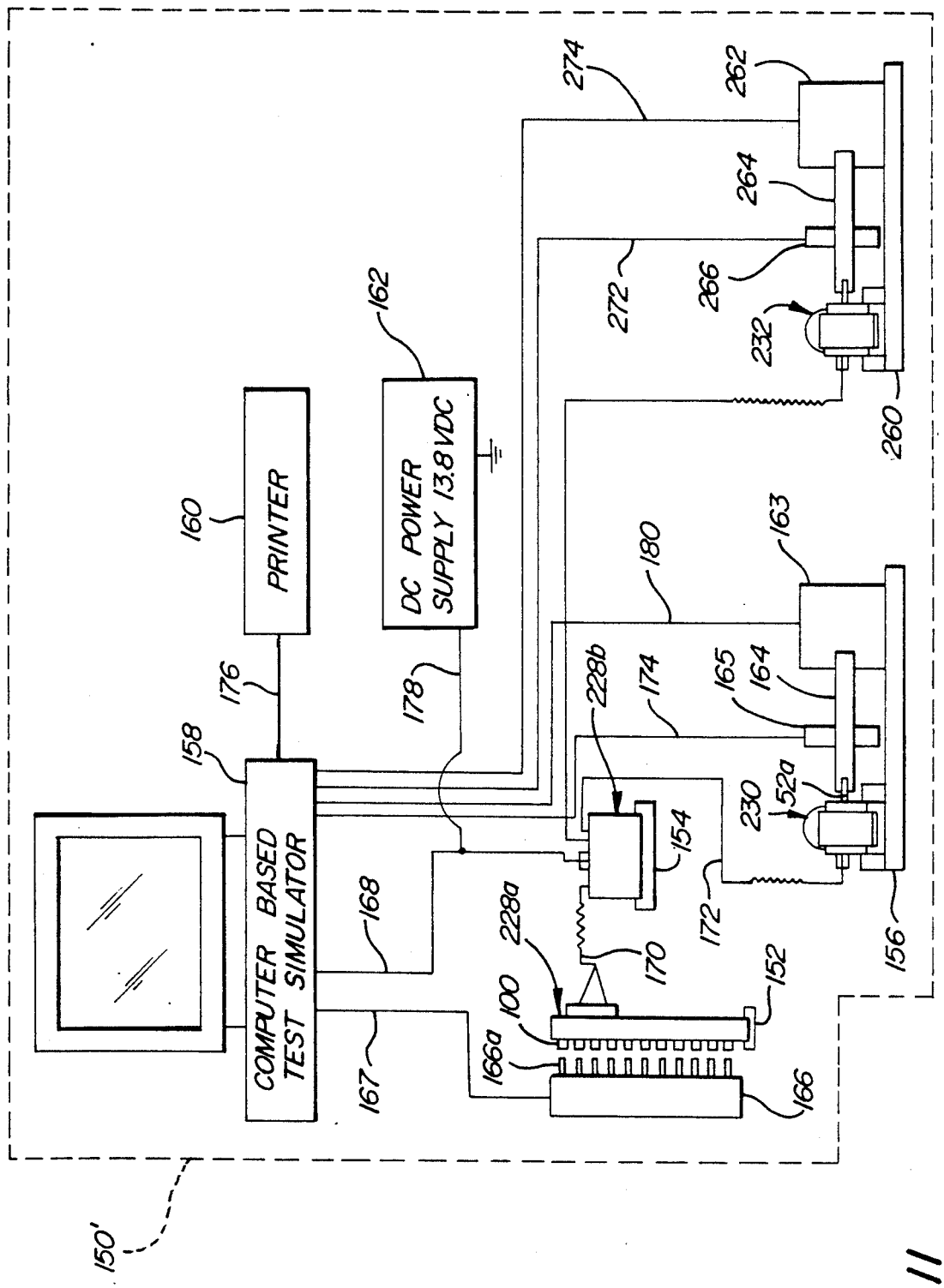
FIG. 11 is a schematic view of a test fixture utilized in the invention methodology as applied to the electric shift apparatus of FIG. 10.

The test fixture 150' employed to test the electric shift apparatus of the FIG. 10 embodiment is seen in diagrammatic form in FIG. 11. Test fixture 150' corresponds generally to test fixture 150 with the exception that it additionally includes a second power unit fixture 260; a further electromagnetic brake 262 drivingly connected to a shaft 264; and a further separate gear position encoder 266 encircling shaft 264. Encoder 266 may be identical to the encoder 165 of the test fixture of FIG. 8. Push button actuator 166 of the test fixture of FIG. 11 corresponds generally to the push button actuator 166 of the test fixture of FIG. 8 with the exception that further push button actuators 166a are provided corresponding to the further push buttons 100 of the push button submodule 228a corresponding to the transfer case modes. Power unit 232 is connected to logic unit 228b via lead 270; encoder 266 is positioned in encircling relation to shaft 264 and is connected to stimulator 158 via a lead 272; and electromagnetic brake 262 is connected to stimulator 158 via a lead 274.

The tests performed by simulator 158 on the shift control apparatus of the FIG. 10 embodiment are generally similar to the tests previously described with respect to the shift control apparatus of the FIGS. 1-9 embodiment with the exception that, in addition to the tests described previously with respect to FIG. 8, the simulator is additionally programmed to cycle the power unit 232 through its various positions corresponding to the various shift modes of the transfer case 216 in response to actuation of the appropriate push buttons 100 of the push button module 228a by the push button actuators 168a of the push button actuator 166. During the simulated testing of the power unit 232, encoder 266 functions to apprise the simulator of the position of the output shaft of the power unit and brake 262 is controlled in a manner to apply a load to shaft 264 and thereby to power unit 232 corresponding to the load encountered in an actual vehicle duty cycle. If the power unit 232 fails to shift to any of the requested positions in response to the simulated signals provided by simulator 158 via push button actuator 166 and logic unit 228b, the unit is rejected.

The manner in which the test fixture 150' is incorporated in the overall methodology is illustrated in FIG. 9 in a chain line format.

Specifically, in addition to the methodology steps previously described with respect to the operator input units 36a, the logic units 36b, and the first power units 34 (or in the case of the FIG. 10 embodiment, operator input units 228a, logic units 228b, and first power units 230), a plurality of second power units 232 are manufactured, gathered together and placed in a suitable container or dunnage 280, and shipped to the test site where they are assembled in a fixture 150' together with a unit 228a,228b and 230 in the manner described with respect to FIG. 11 and the various previously described tests are performed on the units. Following the various tests, and assuming that all the units pass the various tests, the test assembly is disassembled into a control module 228, comprising an operator input unit 228a connected to a logic unit 228b, a second module comprising a first power unit 230, and a third module comprising a second power unit 232. Control modules 228 are placed back in the container or dunnage 182 and the tested modules are shipped to a motor vehicle body assembly site where each module 228 is mounted in an opening 10a of an instrument panel 10 moving along a trim line 190. The power modules 228 are placed back in the dunnage 186 and the tested modules are shipped to a motor vehicle chassis assembly site where each power module 230 is mounted on an automatic transmission 24 moving along an automatic transmission assembly line 192. The power modules 232 are placed back in the dunnage 280 and the tested modules are shipped to a motor vehicle chassis assembly site where each power module 32 is mounted on a transfer case 216 moving along a transfer case assembly line 282. Instrument panels 10, with a control module 228 installed therein, move along the trim line 190 and thence to the main body assembly line 194 and thence to the final vehicle assembly location 196. Similarly, transfer cases 216 with power units 232 attached thereto move along the transfer case line 282 and thence to the transmission line 192 where the transmission and transfer case are combined to form the transmission assembly whereafter the transmission assembly is moved to the main chassis line 198 and thereafter to the final vehicle assembly location 196 where the body and chassis are combined to form the final vehicle. As with the FIGS. 1-9 embodiment, and according to a further alternate form of the invention methodology, the logic unit and operator input units may be disassembled from the fixture 150' as separate modules and moved respectively to the trim line 190 and the assembly line 200 in the manner previously described with respect to the FIGS. 1-9 embodiment.

Whereas preferred embodiments of the invention have been illustrated and described in detail, it will be apparent that various changes may be made in the disclosed embodiments not departing from the scope or spirit of the invention.

We claim:

1. A method of providing a pretested electric shift control apparatus for the automatic transmission of a motor vehicle including an operator input unit for mounting in the instrument panel of the motor vehicle, a power unit for mounting proximate the transmission of the motor vehicle, and a logic unit for mounting on the motor vehicle in a position in which it is electrically interconnected between the operator input unit and the power unit and operates to transmit operator input signals from the operator input unit to the power unit to shift the transmission to the position corresponding to the operator input, said method comprising the steps of:

manufacturing a plurality of operator input units;
  manufacturing a plurality of power units;
  manufacturing a plurality of logic units;
  providing a test assembly by assembling an operator input unit, a power unit, and a logic unit in a test fixture in a manner which simulates their assembled interconnection on the motor vehicle;
  performing tests on the test assembly that simulate the combined operation of the units on the motor vehicle;
  disassembling the test assembly into at least first and second tested modules;
  transporting the tested and disassembled modules to at least one motor vehicle assembly site; and
  reassembling each tested first module on a motor vehicle in combination with a tested second module, thereby providing a pretested electric shift control apparatus for the motor vehicle.

2. The method of claim 1 wherein:
  said method includes the further steps of gathering the manufactured operator input units, thereby providing a supply of operator input units, gathering the manufactured power units, thereby providing a supply of power units, and gathering the manufactured logic units, thereby providing a supply of logic units; and
  said providing a test assembly step comprises taking an operator input unit from the supply of operator input units, a power unit from the supply of power units, and a logic unit from the supply of logic units.

3. The method according to claim 2 wherein:
  said method includes the further step of gathering the tested first modules thereby providing a supply of tested first modules, and gathering the tested second modules, thereby providing a supply of tested second modules.

4. A method according to claim 1 wherein:
  said disassembling step comprises disassembling said test assembly into a first module comprising a power unit and a second module comprising an operator input unit connected to a logic unit.

5. A method according to claim 4 wherein:
  said transporting step comprises transporting said first module to a motor vehicle chassis assembly site for attachment to the automatic transmission of the motor vehicle and transporting said second module to a motor vehicle body assembly site for mounting in the instrument panel of the motor vehicle.

6. The method according to claim 1 wherein:
  said disassembling step comprises disassembling said test assembly into a first module comprising a power unit, a second module comprising an operator input unit, and a third module comprising a logic unit.

7. The method according to claim 6 wherein:
  said transporting step comprises transporting said first module to a motor vehicle chassis assembly site for attachment to the automatic transmission of the motor vehicle, transporting said second module to a motor vehicle body assembly site for mounting in the instrument panel of the motor vehicle, and transporting said third module to a motor vehicle assembly site for mounting on the motor vehicle in a position to facilitate its electrical interconnection to the first module and the second module.

8. The method according to claim 1 wherein the automatic transmission includes the transmission states of park, reverse, neutral and drive and wherein:
  said tests include, with the power unit in a position corresponding to a transmission state other than park, simulating a vehicle ignition off signal and monitoring the shifting of the power unit to a position corresponding to the transmission state of park.

9. The method according to claim 1 wherein the automatic transmission includes the transmission states of park, reverse, neutral and drive and wherein:
  said tests include, with the power unit in a position corresponding to the transmission state of park and in the absence of a braking signal, supplying an operator input other than park to the logic unit via the operator unit and monitoring the shifting of the power unit to a position corresponding to the operator input.

10. The method according to claim 1 wherein the automatic transmission includes the transmission states of park, reverse, neutral and drive and wherein:
  said tests include, with the power unit in a position corresponding to the transmission state of park and with the power unit output loaded to simulate disposition of the vehicle on a grade, supplying an operator input other than park to the logic unit via the operator input unit and monitoring the shifting of the power unit to a position corresponding to the operator input.

11. The method according to claim 1 wherein the automatic transmission includes the transmission states of park, reverse, neutral and drive and wherein:
  one of said tests includes cycling the power unit through positions corresponding to all of the transmission states in response to corresponding operator inputs to the logic unit via the operator input unit.

12. The method according to claim 1 wherein the automatic transmission includes the transmission states of park, reverse, neutral and drive and wherein:
  said tests include transmitting respective operator inputs to the logic unit via the control unit corresponding to the various transmission states while transmission respective simulated vehicle threshold signals to the logic unit and observing the shifting of the power unit.

13. A method of providing a pretested electric shift apparatus for the automatic transmission of a motor vehicle including an operator input unit for mounting in the instrument panel of the motor vehicle, a power unit for mounting proximate the transmission of the motor vehicle, and a logic unit for mounting on the motor vehicle in a position in which it is electrically interconnected between the operator input unit and the power unit and operates to transmit the operator input signals from the operator input unit to the power unit to shift the transmission to the position corresponding to the operator input, said method comprising the steps of:

manufacturing a plurality of operator input units and gathering said operator input units, thereby providing a supply inventory of said operator input units;
  manufacturing a plurality of power units and gathering said power units, thereby providing a supply inventory of power units;

manufacturing a plurality of logic units and gathering said logic units, thereby providing a supply inventory of logic units;

providing a succession of test assemblies, with each test assembly being provided by assembling an operator input unit from the operator input unit supply inventory, a logic unit from the logic unit supply inventory, and a power unit from the power unit supply inventory, in a test assembly and interconnecting the units in a manner which simulates their assembled interconnection in the motor vehicle;

performing tests on each test assembly that simulate the combined operation of the units on the motor vehicle;

disassembling each test assembly into at least first and second tested modules;

gathering the tested first modules into a tested first module inventory;

gathering the tested second modules into a tested second module inventory;

transporting the tested first and second module inventories to at least one motor vehicle assembly site; and reassembling each tested first module on a motor vehicle in combination with a tested second module, thereby providing a pretested electric shift control apparatus for the motor vehicle.

14. A method according to claim 1 wherein said power unit comprises a first power unit, the motor vehicle further includes a transfer case drivingly connected to the output of the automatic transmission, the electric shift control apparatus further includes a second power unit for mounting proximate the transfer case of the motor vehicle, the logic unit operates to transmit operator input signals from the operator input unit to the second power unit to shift the transfer case to the position corresponding to the operator input and:

said method includes the further step of manufacturing a plurality of second power units; and said test assembly providing step includes assembling a second power unit in the test fixture in a manner which simulates its assembled interconnection to the logic unit, the operator input unit, and the first power unit on the motor vehicle.

15. The method according to claim 14 wherein:

said disassembling step comprises disassembling said test assembly into at least first, second and third tested modules; and said reassembling step comprises reassembling each tested first module on a motor vehicle in combination with a tested second module and a tested third module.

16. The method according to claim 15 wherein:

said disassembling step comprises disassembling said test assembly into a first module comprising a first power unit, a second module comprising an operator input unit connected to a logic unit, and a third module comprising a second power unit.

17. The according to claim 15 wherein:

said disassembling step comprises disassembling said test assembly into a first module comprising a first power unit, a second module comprising an operator input unit, a third module comprising a logic unit, and a fourth module comprising a second power unit.

* * * * *